US011976743B2

(12) United States Patent
Aki et al.

(10) Patent No.: US 11,976,743 B2
(45) Date of Patent: May 7, 2024

(54) WIRELESS VALVE MANIFOLD

(71) Applicant: SMC CORPORATION, Chiyoda-ku (JP)

(72) Inventors: Tomohiko Aki, Nagareyama (JP); Norimasa Ozaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 584 days.

(21) Appl. No.: 17/273,176

(22) PCT Filed: Aug. 19, 2019

(86) PCT No.: PCT/JP2019/032232
§ 371 (c)(1),
(2) Date: Mar. 3, 2021

(87) PCT Pub. No.: WO2020/049984
PCT Pub. Date: Mar. 12, 2020

(65) Prior Publication Data
US 2021/0324964 A1    Oct. 21, 2021

(30) Foreign Application Priority Data
Sep. 7, 2018    (JP) .................. 2018-167916

(51) Int. Cl.
*H02J 50/80* (2016.01)
*B25J 19/00* (2006.01)
(Continued)

(52) U.S. Cl.
CPC ............. *F16K 31/06* (2013.01); *B25J 19/005* (2013.01); *F16K 27/12* (2013.01); *B25J 15/0052* (2013.01)

(58) Field of Classification Search
CPC .. H02J 50/12; H02J 50/80; H02J 50/90; B25J 19/005
(Continued)

(56) References Cited

U.S. PATENT DOCUMENTS

| 10,194,599 B2 | 2/2019 | Ensworth et al. | |
| 2015/0005939 A1* | 1/2015 | Di Stefano | B25J 19/0045 700/258 |
| 2019/0234227 A1* | 8/2019 | McConkey | H02K 11/35 |

FOREIGN PATENT DOCUMENTS

| DE | 10 2015 113 492 A1 | 2/2017 |
| EP | 2 281 159 A1 | 1/2015 |

(Continued)

OTHER PUBLICATIONS

Extended European Search Report dated May 10, 2022 in European Patent Application No. 198565269, 8 pages.
(Continued)

*Primary Examiner* — Nathaniel R Pelton
(74) *Attorney, Agent, or Firm* — Oblon, McClelland, Maier & Neustadt, L.L.P.

(57) ABSTRACT

A wireless valve manifold is capable of wireless communication, and includes a plurality of solenoid valves. This wireless valve manifold is able to move by means of a movable unit. In addition, the wireless valve manifold includes a battery which can supply power to the plurality of solenoid valves, and a power-receiving control unit which is connected to the battery and which charges the battery with power by means of wireless power transmission from a feeder station of the wireless valve manifold.

4 Claims, 3 Drawing Sheets

(51) Int. Cl.
  *F16K 27/12* (2006.01)
  *F16K 31/06* (2006.01)
  *B25J 15/00* (2006.01)

(58) Field of Classification Search
  USPC .......................................................... 320/108
  See application file for complete search history.

(56) References Cited

FOREIGN PATENT DOCUMENTS

| | | | |
|---|---|---|---|
| JP | 7-19793 A | | 1/1995 |
| JP | 7-068483 | * | 3/1995 |
| JP | 7-68483 A | | 3/1995 |
| JP | 5726483 B2 | | 6/2015 |

OTHER PUBLICATIONS

International Search Report dated Nov. 5, 2019 in PCT/JP2019/032232 filed Aug. 19, 2019, 2 pages.
Indian Office Action dated Feb. 4, 2022 in Indian Patent Application No. 202147015553, 5 pages.

* cited by examiner

WIRELESS VALVE MANIFOLD

TECHNICAL FIELD

The present invention relates to a wireless valve manifold configured to be movable.

BACKGROUND ART

Robotic systems include, for example, end effectors that grip workpieces. The end effectors are provided with mechanisms for handling workpieces. In Japanese Laid-Open Patent Publication No. 07-019793, for example, an end effector is provided with a nozzle (lance) used to pressure-wash workpieces. The lance performs pressure-washing on the basis of opening and closing a valve (solenoid valve).

Although not disclosed in Japanese Laid-Open Patent Publication No. 07-019793, in a case of a robotic system configured to handle specific tasks (for example, to transfer workpieces) by operating a plurality of mechanisms corresponding to a plurality of solenoid valves, the end effector is provided with a valve manifold to operate the plurality of solenoid valves. For example, the valve manifold causes mechanism portions to operate (for example, grip workpieces) by switching between supplying and discharging of pressurized fluid on the basis of energization and de-energization of the solenoid valves.

SUMMARY OF INVENTION

A robotic system of this type includes harnesses installed along robotic arms in order to continuously supply electric power to a valve manifold on an end effector. However, the installed harnesses limit the movable range of the robot and may cause disadvantages such as getting tangled in members constituting the robot. In a case where the valve manifold includes a large number of valves and the end effector is equipped with a battery, the size, and thus the weight, of the battery increase since the valve manifold consumes considerable power.

The present invention has been devised taking into consideration the aforementioned circumstances, and has the object of providing a wireless valve manifold enabling stable movement of a movable unit and continuous operation of the manifold, by wireless power transfer to the wireless valve manifold.

To achieve the above-described object, according to an aspect of the present invention, there is provided a wireless valve manifold including a plurality of solenoid valves and being configured to perform wireless communication, wherein the wireless valve manifold is configured to be moved by a movable unit, the wireless valve manifold including a battery configured to store electric power and to supply the electric power to the plurality of solenoid valves and a power receiving part connected to the battery and configured to charge the battery by wireless power transfer from a feeding station for the wireless valve manifold.

According to the present invention, the wireless valve manifold includes the battery and the power receiving part, and thus the battery can be charged by wireless power transfer at appropriate timings such as temporary halts of the wireless valve manifold. This eliminates the need to provide the movable unit with harnesses for supplying electric power to the wireless valve manifold through the movable unit. In addition, the capacity of the battery can be reduced, leading to a reduction in the weight and size of the battery. As a result, stable movement of the movable unit and continuous operation of the wireless valve manifold can be achieved. In particular, the wireless valve manifold is often used in environments where dust, oil mist, and the like are scattered inside factories. Application of the battery and the power receiving part reduces exposure of the internal structure to such environments and consequently improves the dust and water resistance significantly. Furthermore, the battery can be replaced when the performance degrades.

DESCRIPTION OF EMBODIMENT

A preferred embodiment according to the present invention will now be described with reference to the accompanying drawings.

Figure 1:
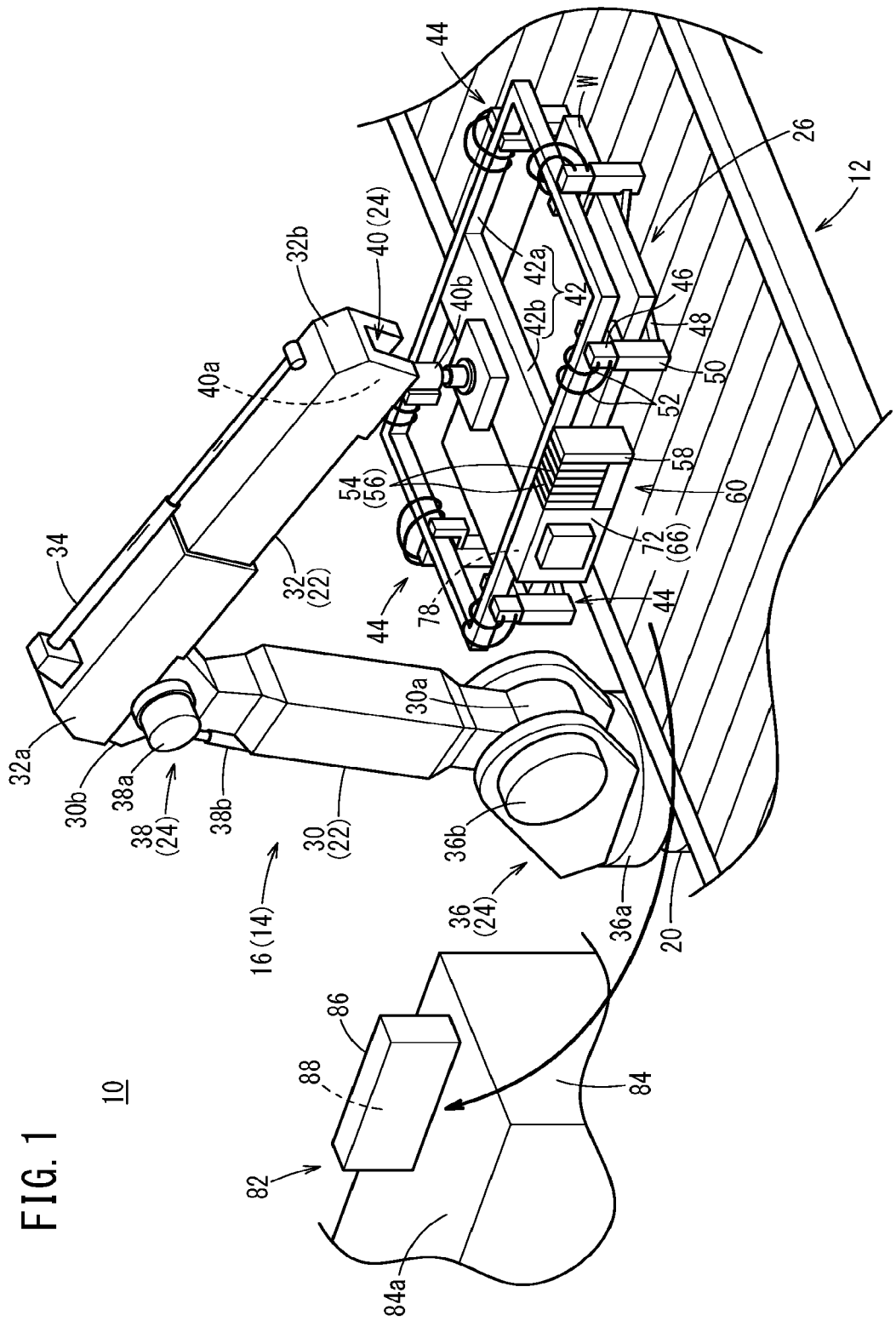
FIG. 1 is an explanatory diagram showing a robotic system according to an embodiment of the present invention.

As illustrated in FIG. 1, for example, a robotic system 10 according to an embodiment of the present invention is installed in a factory and disposed adjacent to a conveyor 12 that transfers a workpiece W. The robotic system 10 grips and moves the workpiece W to place the workpiece W on the conveyor 12 or takes out the workpiece W on the conveyor 12 to move the workpiece W to another location. The robotic system 10 is not limited to systems that transfer the workpiece W but can be applied to various structures configured to be movable to handle (transfer, machine, assemble, inspect, sort, pack, and the like) the workpiece W.

The robotic system 10 includes an articulated robot 16 (hereinafter also simply referred to as "robot 16") that moves the workpiece W and a control unit 18 (see FIG. 2) that controls the movement of the robot 16. The robot 16 corresponds to a movable unit 14 of the present invention. The robot 16 includes a base 20 for fixing, a plurality of arms 22 mounted on the base 20, a plurality of joint portions 24 each connecting the base 20 or one of the arms 22 to another arm 22 such that the angle therebetween can be changed, and an end effector 26 directly gripping the workpiece W. The whole robot 16 may be configured to be movable.

Specifically, the plurality of arms 22 includes a first arm 30 and a second arm 32. The first arm 30 has a predetermined length and includes a first end part 30a connected to an upper part of the base 20. The second arm 32 includes a first end part 32a connected to the first arm 30 and a second end part 32b connected to the end effector 26. While the extension length of the first arm 30 is unchangeable, the second arm 32 is extensible in the direction of extension. For example, the second arm 32 is of a telescopic type including a plurality of tubular bodies that are telescopically combined together, and includes an arm extension cylinder 34 on a side surface. The arm extension cylinder 34 is connected to the proximal end of a tubular body disposed at the first end part 32a and to the distal end of a tubular body disposed at the second end part 32b. The arm extension cylinder 34 moves a cylinder shaft back and forth under the control of the control unit 18, thereby causing the tubular body at the second end part 32b to move back and forth with respect to the tubular body at the first end part 32*a*. As a result, the second arm 32 extends and retracts.

On the other hand, the plurality of joint portions 24 include a first joint portion 36 disposed between the base 20 and the first arm 30, a second joint portion 38 disposed between the first arm 30 and the second arm 32, and a third joint portion 40 disposed between the second arm 32 and the end effector 26.

The first joint portion 36 includes a horizontal rotation part 36*a* that can rotate the first arm 30 360° horizontally (along the horizontal plane) on the upper surface of the base 20 and a vertical rotation part 36*b* that can rotate the first arm 30 vertically above the horizontal rotation part 36*a*. The horizontal rotation part 36*a* and the vertical rotation part 36*b* each include a servomotor and the like (not illustrated) inside the rotation parts. The servomotors are supplied with electric power under the control of the control unit 18 to thereby rotate, in order to change the horizontal orientation of the first arm 30 with respect to the base 20 and the inclination angle with respect to the horizontal direction.

The second joint portion 38 includes a bearing mechanism part 38*a* that rotatably connects a second end part 30*b* of the first arm 30 and the first end part 32*a* of the second arm 32, and an arm rotation cylinder 38*b* connected to the control unit 18 to be moved back and forth under the control of the control unit 18. The arm rotation cylinder 38*b* includes a cylinder tube attached to the first arm 30 and a cylinder shaft attached to the second arm 32. The cylinder shaft moves back and forth relative to the cylinder tube. That is, the second arm 32 rotates around the bearing mechanism part 38*a* according to the extension and retraction of the cylinder shaft, so that the angle of the second arm 32 relative to the first arm 30 is adjusted.

The third joint portion 40 includes a rotatably supporting mechanism part 40*a* that allows the end effector 26 to hang down vertically at the second end part 32*b* of the second arm 32 and an end-effector moving cylinder 40*b* that is secured to the rotatably supporting mechanism part 40*a* and that extends and retracts vertically. The rotatably supporting mechanism part 40*a* supports the end-effector moving cylinder 40*b* such that the end-effector moving cylinder 40*b* is oriented in the vertical direction regardless of the angle of the second arm 32. The end-effector moving cylinder 40*b* is connected to the control unit 18 and moves back and forth under the control of the control unit 18 in conjunction with the movement of the end effector 26 gripping the workpiece W or letting go the gripping.

The end effector 26 includes a frame 42 connected to the second arm 32 (third joint portion 40) and a plurality of gripping mechanisms 44 secured to the frame 42. The frame 42 includes an outer frame 42*a* having a rectangular shape when viewed in plan and a middle frame 42*b* extending in a lateral direction between the middles of the longitudinal parts of the outer frame 42*a*. The outer frame 42*a* is designed to have plan dimensions corresponding to the shape of the workpiece W to be transferred. A cylinder shaft of the end-effector moving cylinder 40*b* is secured to the center portion of the middle frame 42*b* (center-of-gravity position on the horizontal plane of the end effector 26).

The plurality of gripping mechanisms 44 are secured at positions adjacent to both ends of the longitudinal parts of the outer frame 42*a* and at center positions of the lateral parts of the outer frame 42*a*. That is, the end effector 26 of this embodiment includes six gripping mechanisms 44. The gripping mechanisms 44 each include a fluid pressure cylinder 46 that operates on the basis of supplying and discharging of pressurized fluid (such as air), a supporting portion 48 that directly supports the workpiece W, and a movement transmitting portion 50 that converts the moving force of the fluid pressure cylinder 46 to operate the supporting portion 48. The gripping mechanisms 44 are secured to the outer sides of the outer frame 42*a* by, for example, screwing the movement transmitting portions 50 onto side surfaces of the outer frame 42*a*.

Each of the fluid pressure cylinders 46 includes, for example, a piston and a piston rod (both not illustrated) inside the cylinder hole and is connected to tubes 52 through which pressurized fluid is supplied and discharged. The fluid pressure cylinder 46 advances the piston and the piston rod using pressurized fluid supplied into a chamber of the cylinder hole that lies on the proximal end side of the piston and retracts the piston and the piston rod using pressurized fluid supplied into another chamber thereof that lies on the distal end side of the piston. The fluid pressure cylinder 46 may be a mechanism or the like that rotates a shaft on the basis of supplying and discharging of pressurized fluid.

Each of the supporting portions 48 is configured as a scraper that can change its position between a retract position where the supporting portion 48 retracts from the workpiece W and a gripping position where the supporting portion 48 gets under the workpiece W, i.e., into its lower side in the direction of gravity. Each of the movement transmitting portions 50 converts the moving force of the piston rod of the corresponding fluid pressure cylinder 46 generated at the back and forth movement into the movement of the corresponding scraper (movement between the retract position and the gripping position).

The end effector 26 according to this embodiment includes a plurality of valve units 54 that switch between supplying pressurized fluid to the fluid pressure cylinders 46 and discharging pressurized fluid from the fluid pressure cylinders 46. Each of the valve units 54 includes a solenoid valve 56 disposed therein. For example, the number of valve units 54 corresponds to the number (six) of gripping mechanisms 44 (fluid pressure cylinders 46). The valve units 54 have an identical shape, and are arranged (lined up) and mounted on a connector connecting base 58 that enables the valve units 54 to be installed together. That is, a wireless valve manifold 60 according to this embodiment includes the plurality of valve units 54 and the connector connecting base 58. The wireless valve manifold 60 is disposed on the outer side (side portion) of the outer frame 42*a*.

Specifically, the valve units 54 each include a casing 62 that accommodates the corresponding solenoid valve 56, flow paths (not illustrated) for pressurized fluid formed inside the casing 62, and a path switching portion (not illustrated) disposed inside the casing 62 to switch the flow paths under the operation of the solenoid valve 56. The casings 62 have a cassette shape that is long in the vertical direction and short in the width direction. Each of the casings 62 is mounted on a mounting surface of the connector connecting base 58, and the mounting surface has plurality of openings (not illustrated) communicating with a plurality of ports formed in the connector connecting base 58.

The valve units 54 are supplied with electric power from the connector connecting base 58, and the valve units operate the respective solenoid valves 56 on the basis of the power supply. For example, pilot solenoid valves are applied to the solenoid valves 56. The pilot solenoid valves change the positions of movable valve portions (not illustrated) to thereby move spools of the path switching portions, by power supply to solenoids (not illustrated). The path switching portions switch between outflows (or inflows) of pressurized fluid from predetermined openings, on the basis of the movement of the spools.

Figure 2:
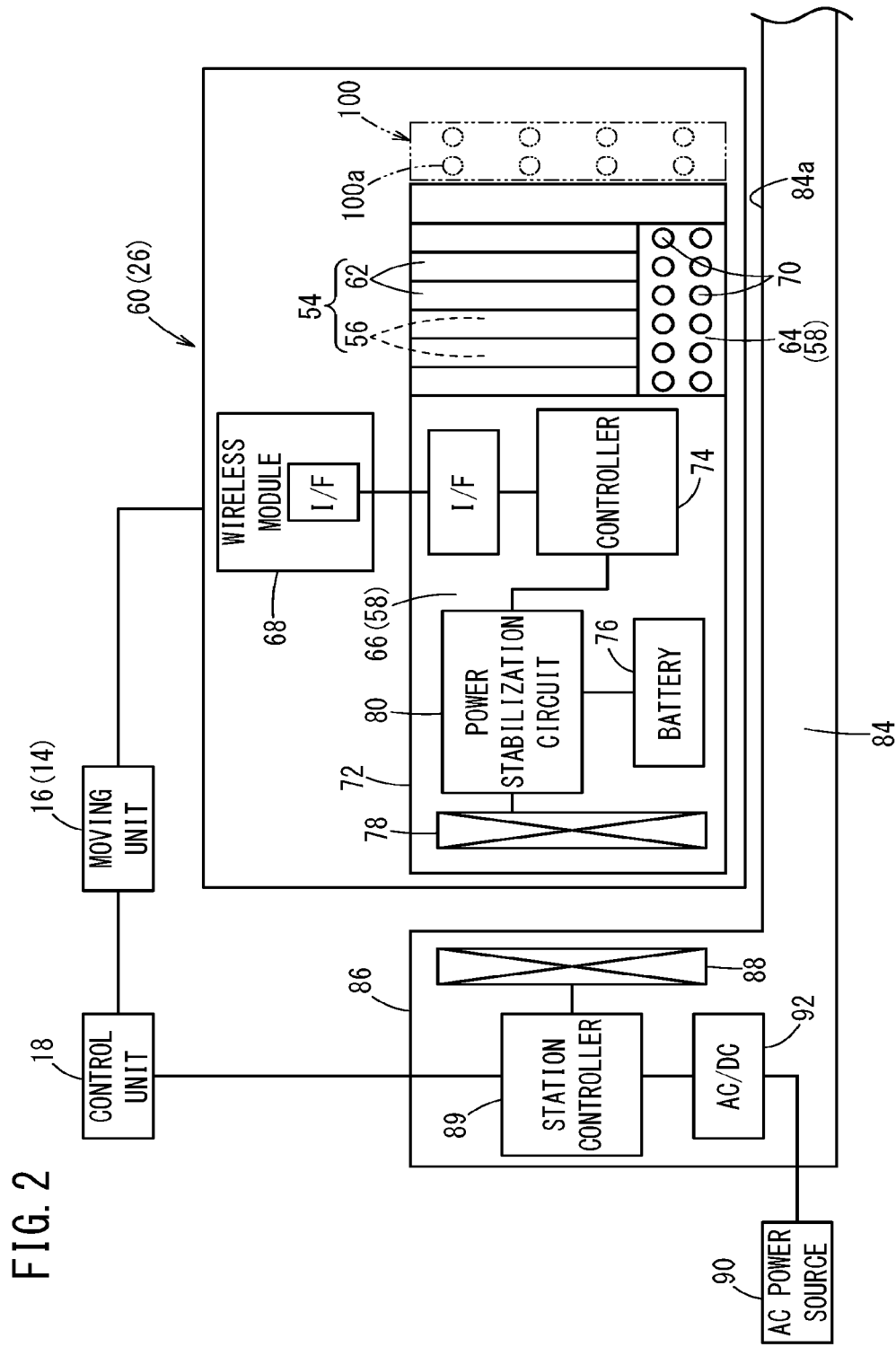
FIG. 2 is an explanatory diagram showing wireless power transfer performed in the robotic system.

As illustrated in FIG. 2, the connector connecting base 58 includes a manifold base 64 on which the plurality of valve units 54 can be arranged and a serial interface unit 66 (hereinafter referred to as "SI unit 66") disposed lateral to the manifold base 64. Moreover, the connector connecting base 58 (SI unit 66) is connected to a wireless module 68 that can perform wireless communication with the control unit 18 of the robotic system 10.

The manifold base 64 has a rail shape that enables the plurality of valve units 54 to be mounted so as to be lined up in the width direction. The manifold base 64 has ports 70 respectively for the valve units 54. Pressurized fluid that has flowed through the valve units 54 flows out through the ports 70 or pressurized fluid flows in the valve units 54 through the ports 70. The manifold base 64 contains therein communication paths (not illustrated) connecting the openings in the plurality of valve units 54 and the ports 70. The ports 70 are connected to the tubes 52 through which pressurized fluid flows, the tubes 52 being connected to the fluid pressure cylinders 46.

The SI unit 66 functions as a slave that receives control signals from the control unit 18 (master) of the robotic system 10 through the wireless module 68, and performs an appropriate process on the basis of the control signals. Moreover, the SI unit 66 is connected to, for example, sensors (not illustrated) that detect the movement of the end effector 26, and sends detection signals from the sensors to the control unit 18. The structure attached to the manifold base 64 is not limited to the SI unit 66. A connector unit of an appropriate wiring type may be applied to the connector connecting base 58.

The SI unit 66 includes a box-shaped housing 72. The housing 72 is provided with a plurality of connectors and a display unit (not illustrated) on its outer surfaces. The plurality of connectors include, for example, a communication connector connected to the wireless module 68, a ground connector connected to the ground, output connectors connected to the valve units 54, and input connectors connected to the sensors or the like. In addition, the housing 72 contains therein a manifold controller 74 (hereinafter simply referred to as "controller 74") that controls operation of the wireless valve manifold 60.

The controller 74 receives an operational command (control signal) for each of the valve units 54 from the control unit 18 via the wireless module 68 and then supplies electric power to the valve units 54 corresponding to the operational commands at appropriate timings. The plurality of valve units 54 energize the coils of the solenoid valves 56 when power is supplied from the controller 74 and de-energize the coils of the solenoid valves 56 when power is not supplied from the controller 74.

Moreover, the housing 72 of the SI unit 66 contains therein a battery 76 that supplies electric power to the valve units 54, a power reception control part 78 (power receiving part) that charges the battery 76 by wireless power transfer, and a power stabilization circuit 80 disposed between the power reception control part 78 and the battery 76.

The battery 76 may be selected as appropriate in consideration of the capacity, size, weight, and the like. The controller 74 is a computer including a processor, memory, and an input/output interface, and operates on the basis of the power supply from the battery 76 to perform appropriate processing. For example, the controller 74 supplies power of the battery 76 to predetermined solenoid valves 56 on the basis of the operational commands from the control unit 18. Moreover, the controller 74 may have the function of monitoring the state of charge (SOC) of the battery 76 and sending information about the SOC to the control unit 18.

The power reception control part 78 receives electric power from outside the wireless valve manifold 60 (a feeding part 88 of a feeding station 82 described below) to thereby charge the battery 76. The method of the wireless power transfer is not limited in particular and may include magnetic field coupling, electric field coupling, evanescent wave method, laser power transfer, microwave power transfer, and ultrasonic power transfer. The power reception control part 78 may have any structure according to the method. For example, in a case of magnetic field coupling (magnetic resonance method), the power reception control part 78 is configured as a power receiving coil with a predetermined shape, and supplies the battery 76 with electromotive force generated by electromagnetic induction via the power stabilization circuit 80. The power stabilization circuit 80 may have the function of switching between discharging electricity (power supply) from the battery 76 to the solenoid valves 56 and charging the battery 76 from the power reception control part 78.

Inside the housing 72, the power reception control part 78 is disposed adjacent to a side surface of the housing opposite to a side surface thereof where the plurality of valve units 54 are arranged. The power reception control part 78 is disposed sufficiently close to the side surface of the housing 72 so that the distance from the feeding part 88 becomes as short as possible during wireless power transfer.

In addition, the robotic system 10 includes the feeding station 82 that wirelessly transfers electric power to the above-described wireless valve manifold 60. The feeding station 82 includes a base portion 84 having an upper surface 84a at a predetermined height, and a protruding portion 86 disposed in a predetermined position on the upper surface 84a. The feeding station 82 also includes, inside the protruding portion 86, the feeding part 88 that wirelessly transfers electric power to the power reception control part 78, and also includes a station controller 89 that controls the feeding part 88. The station controller 89 is connected to the control unit 18.

The feeding station 82 is disposed in the origin position of the end effector 26 of the robot 16. For example, the feeding station 82 is disposed in a position across the robot 16 from the conveyor 12. When having returned (moved) the end effector 26 to the origin position, the robotic system 10 may place the end effector 26 on the upper surface 84a of the base portion 84, or may hold the end effector 26 above the upper surface 84a at a distance therefrom. Moreover, the robotic system 10 may place the end effector 26 that has returned to the origin position, into a temporarily fixed (set) state, or may keep the end effector 26 in a free state in the origin position.

The protruding portion 86 is disposed in a position at which the power reception control part 78 in the wireless valve manifold 60 lies face-to-face with the feeding part 88 at a time when the end effector 26 has returned (moved) to the origin position. The feeding part 88 may have any structure as appropriate according to the method of wireless power transfer (i.e., a structure corresponding to the power reception control part 78). For example, in the case of magnetic field coupling (magnetic resonance method), the feeding part 88 is configured as a power transmitting coil.

The feeding station 82 is connected to an external AC (alternate current) power source 90, and an AC-to-DC converter 92 and the like is disposed between the AC power source 90 and the feeding part 88. Moreover, in a case where the feeding part 88 of the feeding station 82 is configured as a transmitting coil, a high-frequency oscillator, a resistor, a resonant capacitor, and the like (not illustrated) are disposed upstream of the feeding part 88.

Returning to FIG. 2, the control unit 18 of the robotic system 10 is configured as a computer including a processor, memory, an input/output interface, and a wireless module (not illustrated). The control unit 18 controls both the movement of the robot 16 and the movement of the end effector 26 to thereby transfer the workpiece W. To control the end effector 26, the control unit 18 sends operational commands to the wireless valve manifold 60 through wireless communication via the wireless module, to thereby operate the solenoid valves 56. The plurality of gripping mechanisms 44 operate on the basis of operation of the connected valve units 54 (solenoid valves 56).

Moreover, the control unit 18 controls the movement of the robot 16 to thereby move the end effector 26 (wireless valve manifold 60) between a handling position of the workpiece W and the origin position. The handling position of the workpiece W includes, for example, a position where the end effector 26 grips the workpiece W at a location where the workpiece W is stacked (a pickup position of the workpiece W; not illustrated) and a position to which the gripped workpiece W is moved and at which the workpiece W is released from the gripping (a placement position of the workpiece W). In this embodiment, the placement position is located on the conveyor 12. That is, the handling position of the workpiece W corresponds to an area in which the robot 16 transfers the workpiece W.

On the other hand, the origin position corresponds to a position where the feeding station 82 is installed. When the end effector 26 (wireless valve manifold 60) moves to the origin position, the robotic system 10 wirelessly transfers electric power from the feeding part 88 disposed in the origin position to the power reception control part 78 of the wireless valve manifold 60.

The wireless valve manifold 60 according to this embodiment is basically configured as above. Next, the operations thereof will be described.

The robotic system 10 operates the robot 16 on the basis of the control of the control unit 18 to thereby grip the workpiece W using the end effector 26 and to move the gripped workpiece W. The workpiece W is transferred from the pickup position to the conveyor 12 (placement position) in FIG. 1.

To transfer the workpiece W, the control unit 18 issues operational commands to the wireless valve manifold 60 held by the end effector 26, at appropriate timings. The wireless valve manifold 60 supplies electric power of the battery 76 to the plurality of (predetermined) valve units 54 on the basis of the operational commands. At this time, the gripping mechanisms 44 place the respective supporting portions 48 in the retract positions in a state where the solenoid valves 56 of the valve units 54 are not energized. When the solenoid valves 56 are energized, the gripping mechanisms 44 move the respective supporting portions 48 to the gripping positions, and then grip the workpiece W. In a state where the workpiece W is gripped, the wireless valve manifold 60 moves the supporting portions 48 from the gripping positions to the retract positions, and then releases the gripping on the workpiece W by cutting off the power supply to the valve units 54.

The robotic system 10 regularly charges the battery 76 of the wireless valve manifold 60 under the control of the control unit 18. For example, when transferring of the workpiece W is temporarily halted (or every time the workpiece W is transferred), the control unit 18 operates the robot 16 to move the end effector 26 to the feeding station 82 (origin position).

The control unit 18 monitors the coordinate position of the end effector 26 (wireless valve manifold 60), and calculates the travel route of the end effector 26 using the monitored coordinate position and the origin position given in advance, when the end effector 26 moves to the origin position. The robot 16 is operated along the travel route, whereby the power reception control part 78 is moved closer to the feeding part 88 and then becomes face-to-face with the feeding part 88.

When the power reception control part 78 faces the feeding part 88 as a result of the end effector 26 returning to the origin position as illustrated in FIG. 2, the robotic system 10 wirelessly transfers electric power from the feeding part 88 to the power reception control part 78. For example, the station controller 89 or the control unit 18 determines whether the power reception control part 78 lies face-to-face with the feeding part 88, based on detection of the magnetic field at the feeding part 88. The battery 76 in the wireless valve manifold 60, which has become at a low level due to the electric discharge to the solenoid valves 56, is charged in this manner.

The robotic system 10 may be configured to, for example, wirelessly send the SOC of the battery 76 from the wireless valve manifold 60 to the control unit 18 on a constant basis. This enables the control unit 18 to stop supplying power from the feeding part 88 to the battery 76 when the battery 76 is almost fully charged (i.e., higher than or equal to a stop threshold). Moreover, the control unit 18 may be configured to interrupt the process and then move the end effector 26 to the origin position when the SOC is low (i.e., lower than or equal to a charge request threshold).

The present invention is not limited in particular to the embodiment described above, and various modifications can be made thereto without departing from the scope of the present invention. For example, the attachment position of the wireless valve manifold 60 with respect to the end effector 26 is not limited in particular. For example, the wireless valve manifold 60 may be disposed in a central part of the frame 42, and the power reception control part 78 may be disposed on the lower surface side of the housing 72. In this case, in the robotic system 10, the feeding part 88 may be disposed inside the upper surface 84*a* of the feeding station 82, so that wireless power transfer may be performed in a state that the power reception control part 78 faces the feeding part 88 vertically.

Moreover, the wireless valve manifold 60 may be configured to include, as an extended part, an input-signal processing part 100 configured to receive input from sensors (not illustrated) that detect the positions of fluid actuators such as the fluid pressure cylinders 46 (or including other fluid actuators). The input-signal processing part 100 includes therein a plurality of connectors 100*a* connectable to the sensors and a circuit that processes the input from the sensors. The controller 74 can recognize the states of the fluid pressure cylinders 46, based on the input from the sensors suitably.

Figure 3A:
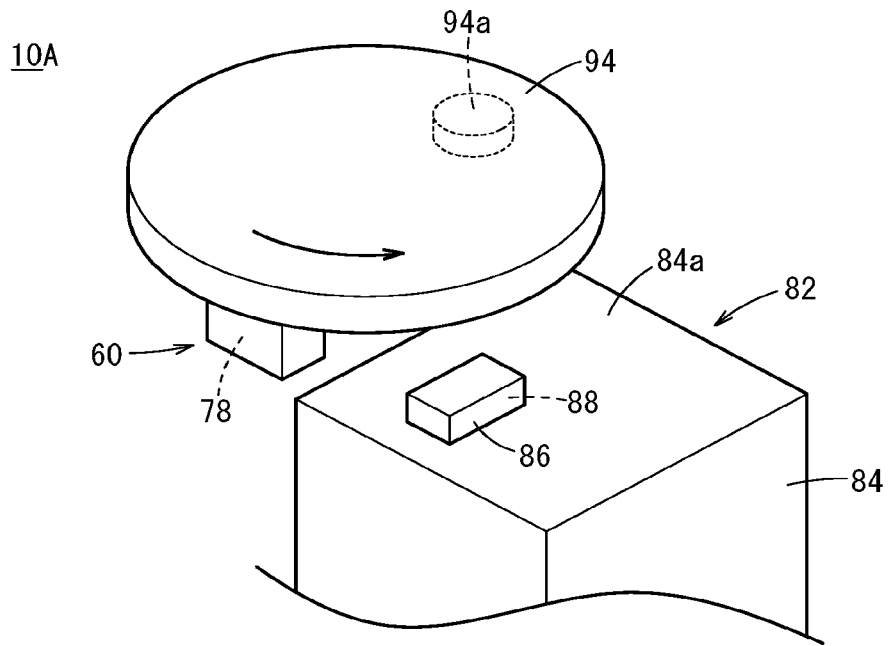
FIG. 3A is an explanatory diagram showing a robotic system according to a first modification.

Moreover, objects to which the wireless valve manifold 60 is attached are not limited to the robot 16. For example, a robotic system 10A according to a first modification illustrated in FIG. 3A includes, as the movable unit 14, a disk 94 that can be rotated by a driving source (not illustrated) in the circumferential direction. The disk 94 includes, at a predetermined position thereof, a mechanism portion 94*a* that handles (for example, transfers) the workpiece W. On the other hand, the wireless valve manifold 60 is attached to the lower surface (or the upper surface) of the disk 94 at a predetermined circumferential position, and moves in an integrated manner with the disk 94 as the disk 94 rotates.

Moreover, the wireless valve manifold 60 includes the power reception control part 78 on a surface (lower surface in FIG. 3A) thereof opposite an attachment surface of the wireless valve manifold 60 which is attached to the disk 94. The power reception control part 78 is configured to face the feeding part 88 of the feeding station 82 when the disk 94 is at a predetermined angular position (origin position). With this structure, the battery 76 in the wireless valve manifold 60 is charged by wireless power transfer at the origin position.

Figure 3B:
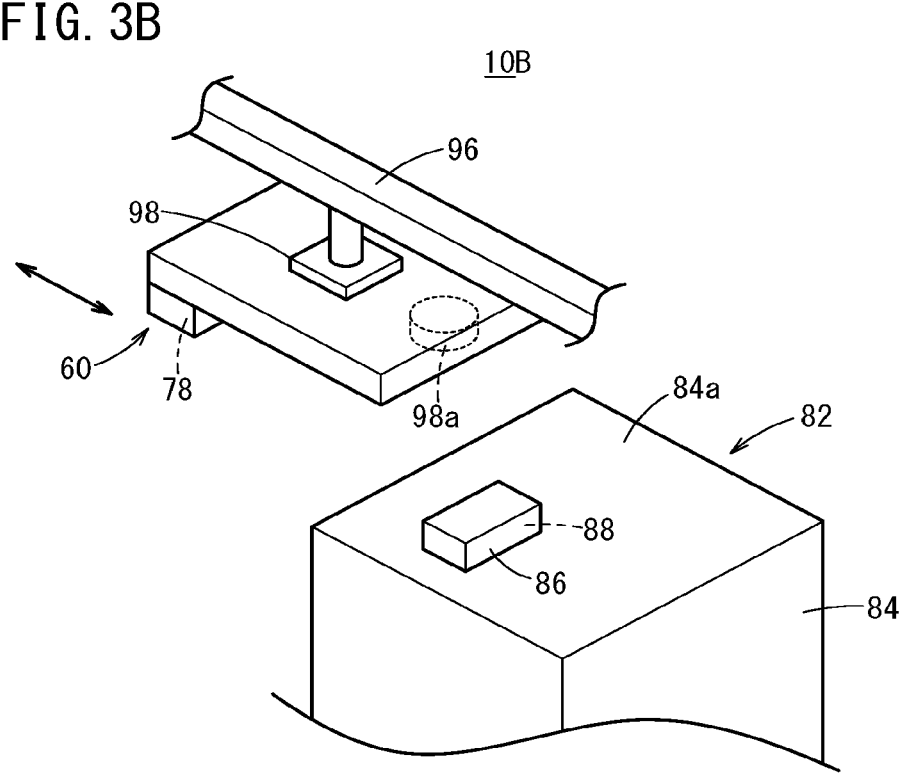
FIG. 3B is an explanatory diagram showing a robotic system according to a second modification.

Moreover, for example, a robotic system 10B according to a second modification illustrated in FIG. 3B includes, as the movable unit 14, a rail 96 and a slider 98 that can be reciprocated linearly by a driving source (not illustrated). The slider 98 includes a mechanism portion 98a that handles (for example, transfers) the workpiece W. Also in this case, the wireless valve manifold 60 is attached to the lower surface or the like of the slider 98 and moves in an integrated manner with the slider 98. When the slider 98 returns to the origin position, the wireless valve manifold 60 faces the feeding part 88 of the feeding station 82, and thereby the battery 76 is charged.

The technical scope and effects that can be understood from the above-described embodiment will be described below.

The wireless valve manifold 60 includes the battery 76 and the power reception control part 78, and thus the battery 76 can be charged by wireless power transfer at appropriate timings such as temporary halts of the wireless valve manifold 60. This eliminates the need to provide the movable unit 14 with harnesses for supplying electric power to the wireless valve manifold 60 through the movable unit 14. In addition, the capacity of the battery 76 can be reduced, leading to a reduction in the weight and size of the battery 76. As a result, stable movement of the movable unit 14 and continuous operation of the wireless valve manifold 60 can be achieved. In particular, the wireless valve manifold 60 is often used in environments where dust, oil mist, and the like are scattered inside factories. Application of the battery 76 and the power reception control part 78 reduces exposure of the internal structure to such environments and consequently improves the dust and water resistance significantly. Furthermore, the battery 76 can be replaced when the performance degrades.

The movable unit 14 is the robot 16 including the end effector 26, and the wireless valve manifold 60 is attached to the side portion of the end effector 26. Thus, the wireless valve manifold 60 is less affected by the end effector 26 when the end effector 26 is moved for wireless power transfer from the external feeding part 88 to the power reception control part 78. For example, the power reception control part 78 can be disposed sufficiently close to the feeding part 88 to thereby increase the charging efficiency.

The control unit 18 is provided that controls the movement of the movable unit 14 (robot 16) to move the wireless valve manifold 60 at least between the origin position and the handling position of the workpiece W. When the wireless valve manifold 60 is moved to the origin position, the wireless power transfer from the feeding part 88 disposed in the origin position to the power reception control part 78 is performed. In this manner, the movement of the wireless valve manifold 60 to the origin position triggers wireless power transfer from the feeding part 88 to the power reception control part 78, thereby facilitating charging of the battery 76.

The power reception control part 78 is accommodated inside the housing 72 disposed at an end of a row of the plurality of solenoid valves 56, and is disposed at a position adjacent to a side surface of the housing opposite to a side surface thereof where the solenoid valves 56 are arranged. In this manner, the power reception control part 78 is disposed inside the housing 72 in the position adjacent to the side surface opposite to the location where the solenoid valves 56 are arranged. This enables the wireless valve manifold 60 to be disposed sufficiently close to the feeding part 88 during wireless power transfer.

Moreover, the wireless valve manifold 60 is configured to include, as an extended part, the input-signal processing part configured to receive input from the sensors that detect the positions of the fluid actuators. In this manner, the wireless valve manifold 60 can implement controls such as recognizing the positions of the fluid actuators such as the fluid pressure cylinders 46 to thereby switch the operation of the solenoid valves 56, and notifying the control unit 18 of the state.

The invention claimed is:

1. A wireless valve manifold including a plurality of solenoid valves and being configured to perform wireless communication and to be moved by a movable unit, the wireless valve manifold comprising:
   a battery configured to store electric power and to supply the electric power to the plurality of solenoid valves;
   a power receiving part connected to the battery and configured to charge the battery by wireless power transfer from a feeding station for the wireless valve manifold; and
   a housing accommodating the power receiving part,
   wherein the plurality of solenoid valves are lined up in a straight row, and
   wherein the housing has a first side surface disposed at an end of the row of the plurality of solenoid valves and a second side surface opposite to the first side surface, and the power receiving part is disposed at a position adjacent to the second side surface of the housing.

2. The wireless valve manifold according to claim 1, wherein:
   the movable unit is a robot including an end effector; and
   the wireless valve manifold is attached to a side portion of the end effector.

3. The wireless valve manifold according to claim 1, wherein:
   a control unit is provided, the control unit being configured to control movement of the movable unit so that the wireless valve manifold is moved at least between a origin position and a handling position of a workpiece; and
   the wireless power transfer from a feeding part disposed in the origin position to the power receiving part is performed when the wireless valve manifold is moved to the origin position.

4. The wireless valve manifold according to claim 1, wherein the wireless valve manifold is configured to include, as an extended part, an input-signal processing part configured to receive input from a sensor that detects a position of a fluid actuator.

* * * * *